United States Patent [19]

Nagasaka

[11] Patent Number: 4,563,602
[45] Date of Patent: Jan. 7, 1986

[54] PERMANENT MAGNET TYPE STEPPING MOTOR

[75] Inventor: Nagahiko Nagasaka, Iruma, Japan

[73] Assignee: Kabushiki Kaisha Yasawa Denki Seisakusho, Kitakyushu, Japan

[21] Appl. No.: 704,710

[22] Filed: Feb. 25, 1985

[30] Foreign Application Priority Data

Jan. 9, 1985 [JP] Japan ................................. 60-1769

[51] Int. Cl.$^4$ ............................................. H02K 41/02
[52] U.S. Cl. ......................................... 310/12; 310/30; 310/49 R
[58] Field of Search ................................ 310/12–15, 310/30, 49, 46, 152, 162–165

[56] References Cited

U.S. PATENT DOCUMENTS

| | | | |
|---|---|---|---|
| 3,999,090 | 12/1976 | Sinnott | 310/49 |
| 4,217,507 | 8/1980 | Jaffe | 310/12 |
| 4,243,899 | 1/1981 | Jaffe | 310/14 |
| 4,349,757 | 9/1982 | Bhafe | 310/304 |
| 4,370,577 | 1/1983 | Wakabayashi et al. | 310/12 |
| 4,504,750 | 3/1985 | Onodera et al. | 310/12 |

OTHER PUBLICATIONS

*IBM Tech Disclosure Bulletin*, "Linear Incremental Motor", Thompson, vol. 6, No. 9, 2/64.

*Primary Examiner*—Donovan F. Duggan
*Attorney, Agent, or Firm*—Ladas & Parry

[57] ABSTRACT

A permanent magnet type stepping motor is provided. The rotor is made of a cylindrical laminated iron core whose outer periphery is toothed at an equal pitch, and the number of teeth is Nr. The stator is made of a laminated iron core whose inner periphery is formed so as to face the rotor at an air gap between the rotor and the stator. Thin plate permanent magnets are attached on the surface of the stator teeth facing the air gap. The permanent magnets are disposed at an equal pitch and polarized such that the polarities of adjacent pole pieces differ from each other. The number of pole pieces is Ns, and has a relation $Ns=2(Nr\pm Np)$, where Np is an integer more than 1. The stator grooves are half opened or closed and have multiphase 2 Np pole distributed windings.

4 Claims, 15 Drawing Figures

PERMANENT MAGNET TYPE STEPPING MOTOR

BACKGROUND OF THE INVENTION

The present invention relates to a pulse driven synchronous machine using a permanent magnet for producing a field in which the rotor is made of toothed and laminated iron core and the stator is attached with permanent magnets forming a field at the surface facing the air gap between the rotor and the stator, and in which multi-phase distributed windings are wound in the stator grooves.

The present invention further relates to a permanent magnet type linear stepping motor utilizing the armature as an inductor and utilizing plural permanent magnets for producing a field.

Conventionally, a permanent magnet field type synchronous machine, e.g., a hybrid type stepping motor is of a homopolar type in which a permanent magnet is mounted on the rotor and magnetic flux is passed in the direction of its axis. Therefore, if a general motor is intended to be manufactured using ferrite core, a high flux density at the air gap cannot be obtained, nor a sufficient torque inertia ratio can be attained unless the stacked length of the core is made extraordinarily short. The homopolar type structure has been known as Slosyn, homo-polar type high frequency generator or the like.

A Slosyn type hybrid stepping motor now available in the market uses high flux density material such as Alnico or rare earth as a permanent magnet. Nevertheless, in order to make the stacked length of the core/diameter ratio large, two to three pieces of magnets must be stacked on the core, which requires very difficult manufacturing processes.

Figure 12:
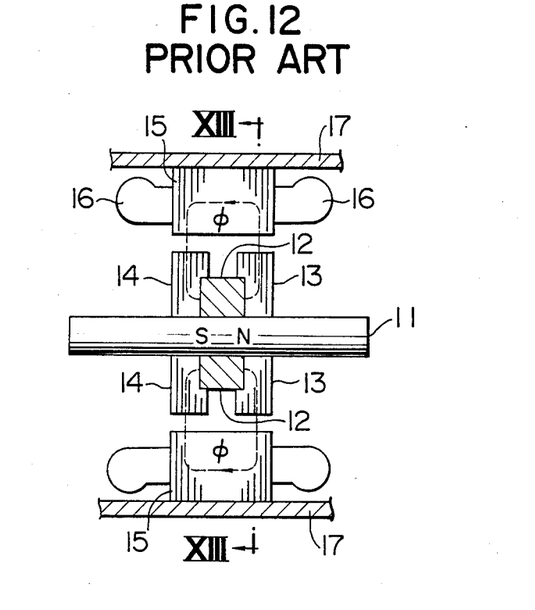
FIG. 12 and FIG. 13 are respectively cross sectional side and front views showing the structure of a prior art homopolar type stepping motor.
Figure 13:
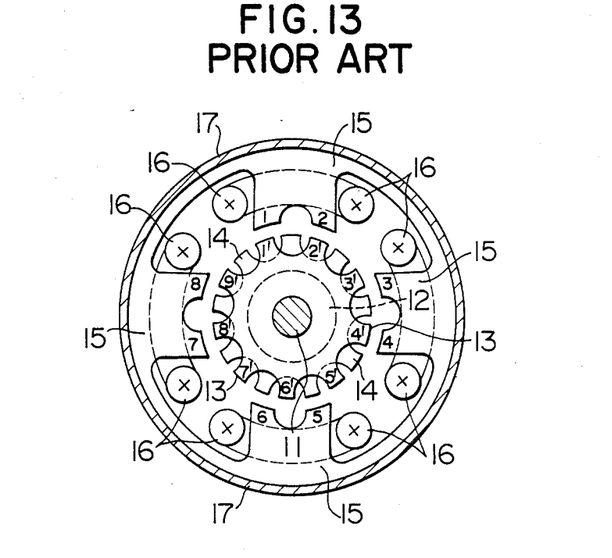

FIG. 12 is a cross sectional side view showing the structure of a homopolar type stepping motor, and FIG. 13 is a cross section along the line X-X' of FIG. 12.

Reference number 11 denotes a rotary shaft made of nonmagnetic material, and reference number 12 denotes a cylindrical type permanent magnet of which N and S poles are magnetized in the direction of the rotary shaft. Teeth portions 13 and 14 are provided at opposite sides of the rotary shaft, the permanent magnet and teeth portions being fixed on the rotary shaft 11. The teeth portions 13 and 14 are positioned such that the teeth of one of the teeth portions superpose the grooves of the other of the teeth portions.

Reference number 15 denotes a stator core the outer periphery of which is surrounded with a casing 17, and coils 16 are wound. The stator core 15 is provided with stator salient poles facing the teeth portions 13 and 14 of the rotor, the stator salient pole being provided with a tooth. The rotor teeth portions 13 and 14 and the stator core 15 are made of laminated iron cores. Thus, unless the stacked thickness of the teeth portions 13 and 14 is made thin, a high density of the air gap flux $\phi$ is not attained.

With the structure of the conventional motor as above, the permanent magnet is mounted remote from the air gap portion between the stator and the rotor. Therefore, the leakage flux is large and the utility of the magnet is poor.

As for the conventional permanent magnet type linear stepping motor, a permanent magnet multi-polarized in the direction of movement has been used as a stator rail. Thus, if a long rail is used, the cost for the rail becomes high. In addition, the need of a protective cover for preventing the attraction of ambient iron particles becomes an issue. Thus, the conventional permanent magnet type liner stepping motor has disadvantages when compared with a hybrid type or variable reactance type linear stepping motor.

The permanent magnet type linear stepping motor as proposed in Japanese Patent Application No. 57-48737 aims to solve the above problems, in which a movable member arrangement is provided sandwiching the rail made of only inductor teeth with an armature electromagnet and a multi-polarized permanent magnet.

Figure 14:
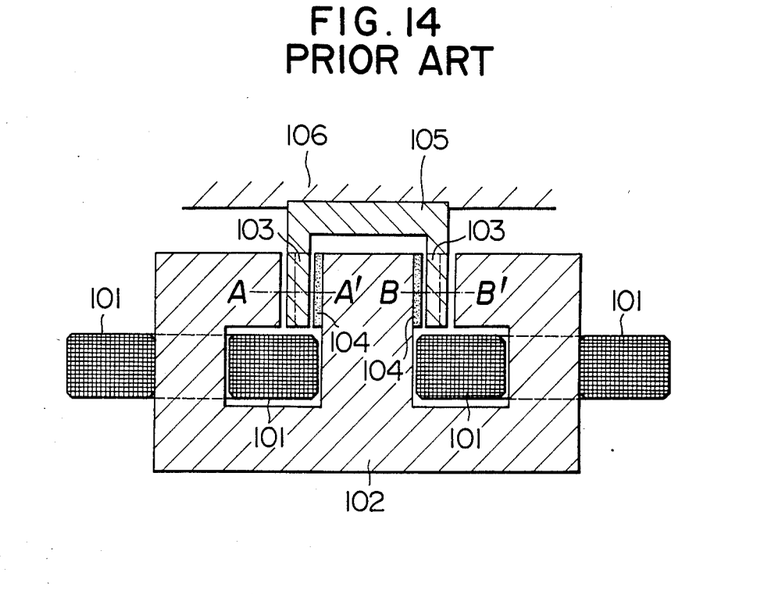
FIG. 14 is a cross sectional front view of the device previously proposed.
Figure 15:
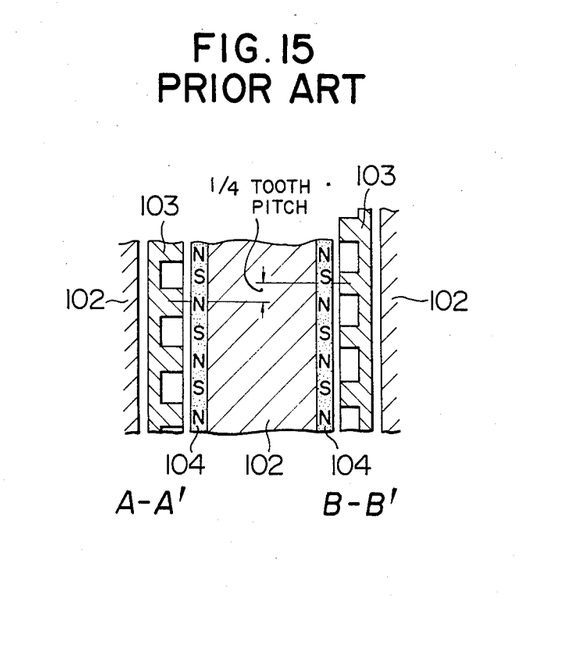
FIG. 15 shows cross sections along the line A-A' and the line B-B' of FIG. 14.

FIG. 14 is a cross sectional front view of the device according to the above prior art, and FIG. 15 shows cross sections respectively along the line A-A' and the line B-B' of FIG. 14.

Reference number 101 denotes coils wound about both sides of a yoke 102, reference number 103 denotes a mover with inductor teeth made of magnetic material, reference number 104 denotes a permanent magnet fixedly attached to the yoke 102 facing the movable member 103, and reference number 105 denotes a nonmagnetic material fixed to the movable member 103 for supporting an industrial machine 106.

The repulsion and attraction actions produced between the pole pieces of the inductor teeth on the mover 103 formed by induction of the coil 101 and the pole pieces of the permanent magnet 104, make the mover 103 move in the direction perpendicular to the drawing paper surface in FIG. 14, that is, in the vertical direction in FIG. 15.

As seen from the drawings, two air gaps are formed which result in a complicated structure and a poor quality of the device.

Sawyer hybrid type linear pulse motors are known in the art which are provided with means for commutating currents without brushes by performing a closed loop control of a three phase linear DC motor, that is, a linear pulse motor.

The motor of this kind, however, has a large leakage flux from the cores forming a magnetic path for concentrating magnetic flux of the permanent magnet. Therefore, a large cross section of the magnetic path is required, and the dimension of the whole device is likely to become bulky.

SUMMARY OF THE INVENTION

It is therefore an object of the present invention to provide a permanent magnet field type synchronous machine in which thin plate magnets are attached on the stator facing the air gap so that the leakage is reduced and the utility of the magnets is improved, and in which permanent magnets of high coercive force (such as rare earth magnet or the like) are used in view of reduction of magnetomotive force directly influenced by the magnetomotive force of the armature.

It is another object of the present invention to provide a permanent magnet type linear stepping motor which can be applied to practical use and can solve the problems associated with the conventional and prior art technique.

It is a still further object of the present invention to provide a three phase linear inductor type motor which is simple in construction and compact and has an integral mover for all three phase windings.

BRIEF DESCRIPTION OF THE DRAWINGS

Other objects and advantages of the invention will become apparent during the following discussion of the accompanying drawings, wherein:

FIGS. 11(a) and (b) are plan views showing confronting faces of the mover and the stator teeth;

DETAILED DESCRIPTION OF THE INVENTION

According to one aspect of the present invention, the rotor is made of a cylindrical laminated iron core whose outer periphery is toothed at an equal pitch, and the number of teeth is Nr. The stator is made of a laminated iron core whose inner periphery is formed so as to face the rotor at the air gap between the rotor and the stator. Thin plate permanent magnets are attached on the surface of the stator teeth facing the air gap. The permanent magnets are disposed at an equal pitch and polarized such that the polarities of adjacent pole pieces differ from each other. The number of pole pieces is Ns, and has a relation $Ns=2(Nr\pm Np)$, where Np is an integer more than 1. The stator grooves are half opened or closed and have multi-phase 2 Np pole distributed windings. According to the one aspect of the present invention, a 2 Nr pole, multiphase synchronous machine can be realized by constructing as above.

Figure 1:
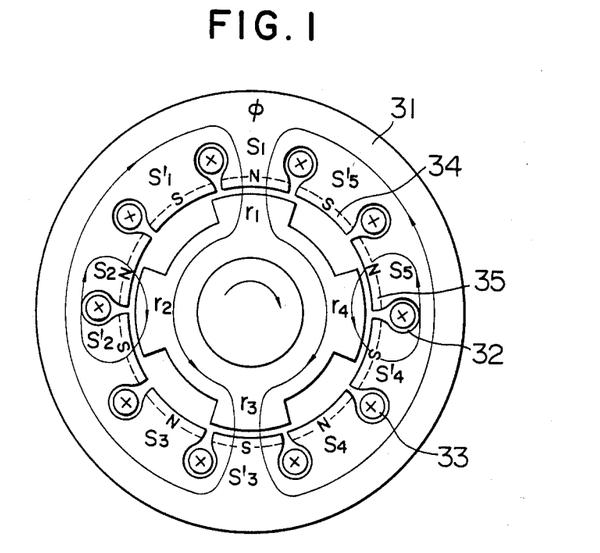
FIG. 1 is a cross sectional side view showing the structure of a first embodiment according to the present invention.

FIG. 1 is a cross sectional front view according to a first embodiment of the present invention.

In the embodiment, it is assumed that the number of rotor teeth Nr is 4 and the numbers of stator grooves and magnet pole pieces are the same, that is, $Ns=2(4+1)$.

Since the integer Np is 1, 2 Np=2 pole, multiphase distributed winding wire 33 is wound in stator grooves 32. N and S pole permanent magnets 34 are attached as shown in FIG. 1 on the surface formed on the inner periphery of the stator 31, thereby forming a 10 pole field.

As the salient pole of the rotor 35 is aligned on an N pole tooth, then the opposite salient pole apart by 180 degrees is aligned on an S pole to form 2 pole passages of the magnetic flux $\phi$.

As the rotor 35 turns clockwise from the position where the rotor salient pole r1 coincides with a stator tooth S1, first the rotor salient pole r2 coincides with the stator tooth S2 to move the magnetic flux from the stator tooth S1 to the stator tooth S2.

Next, the rotor salient pole r3 coincides with the stator tooth S3 to move the magnetic flux to the stator tooth S3, and in turn, the rotor salient pole r4 coincides with the stator tooth S4 to move the magnetic flux $\phi$ to the stator tooth S4. Similarly, the rotor salient pole r1 coincides with the stator tooth S5 to move the magnetic flux $\phi$ to the stator tooth S5, and further the rotor salient pole r2 coincides with the stator tooth S1 to complete one revolution of the magnetic flux $\phi$. In other words, as the rotor 35 turns by $\frac{1}{4}$ revolution, the magnetic flux $\phi$ turns 360 degrees. And as the rotor 35 turns by one revolution, a 4 cycle voltage is generated on the armature winding 33. Thus, the device operates as an 8 pole synchronous machine.

Figure 2:
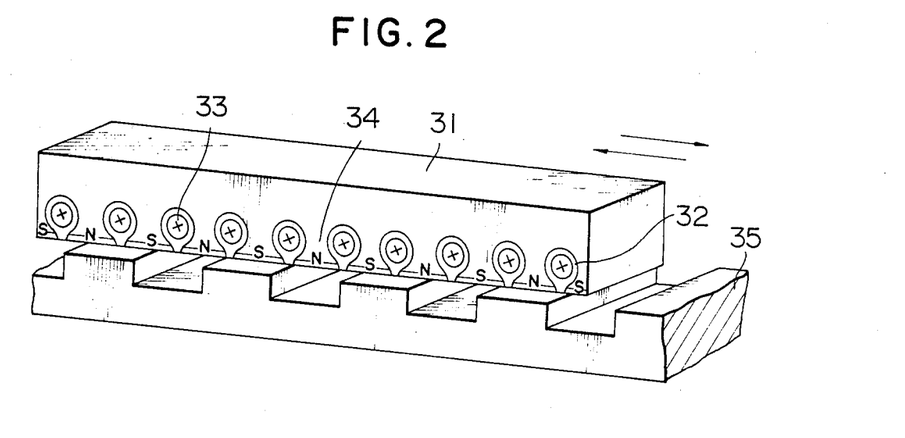
FIG. 2 is a perspective view showing an embodiment of a linear motor according to the present invention.

FIG. 2 is a perspective view showing another embodiment according to the present invention. In the embodiment, the synchronous machine according to the present invention is applied to a linear motor. The rotor 35 is extended as a rail, and the stator is used as a mover. Although the number of grooves Ns of the stator 31 is made the same as the number of pole pieces of the permanent magnet 34, it is not necessary to set the number of grooves of the stator as Ns. For example, a more practical structure can be applied in which the number of grooves 32 of the stator is chosen to have a larger number than Ns, and a multi-phase, 2 Np pole distributed winding 33 is provided and thin cylindrical type permanent magnets of Ns pole polarized are attached inside of the stator 31 facing the air gap.

The number of stator grooves applied to the present invention can be freely selected so as to make the winding process easy. Ns in the equation $2(Nr\pm Np)=Ns$ is the number of pole pieces of the cylindrical magnet provided inside the stator, and the pole pieces are made by polarizing irrespective of the number of grooves.

According to the present invention, the structure has grooves more than two times as large as those in the conventional motor. Therefore, the distribution of magnetomotive force by the winding can be made uniform, and in addition, it is easy to realize a multi-phase device.

Furthermore, the structure of the rotor is simple and robust and has high reliability against high speed, high temperature and shocks.

In addition, there are no causes which might worsen the quality of the device.

In the case that the rotor of a linear motor does not include permanent magnets and that the stator is used as a mover and the rotor is used as a rail, the structure of the rail becomes advantageously simple and cost effective.

The field of application of the present invention may be such as of brush-less DC servomotors, stepping motors, linear motors, AC tachogenerators, linear AC tachogenerators, high frequency power generators and high speed motors.

According to another aspect of the present invention, in a permanent magnet type linear stepping motor of the type that the armature is used as an inductor and the field is produced by multi-polarized permanent magnets, a mover (corresponding to the stator in FIG. 14) is constructed of plural number of units coupled side by side along the direction of movement, the number corresponding to that of phases. The units are respectively provided with a single phase armature winding and yoke and with multi-polarized permanent magnets for producing a field along the direction of movement facing the air gap. The permanent magnets are alternatively magnetized to have N and S pole pieces at an equal pitch along the direction of movement such that the polarities are arranged to have opposite polarities for the pole pieces surrounded by the armature winding and for the pole pieces outside of the armature winding.

The stator is constructed of a laminated iron core of a rial type on the surface of which facing the air gap the inductor teeth are formed at the pitch of the pole piece pair of the permanent magnets. Each phase unit is disposed such that the field pole piece has a constant angular displacement relative to the inductor teeth. Thus, a permanent magnet type linear stepping motor according to the present invention is constructed.

Figure 3:
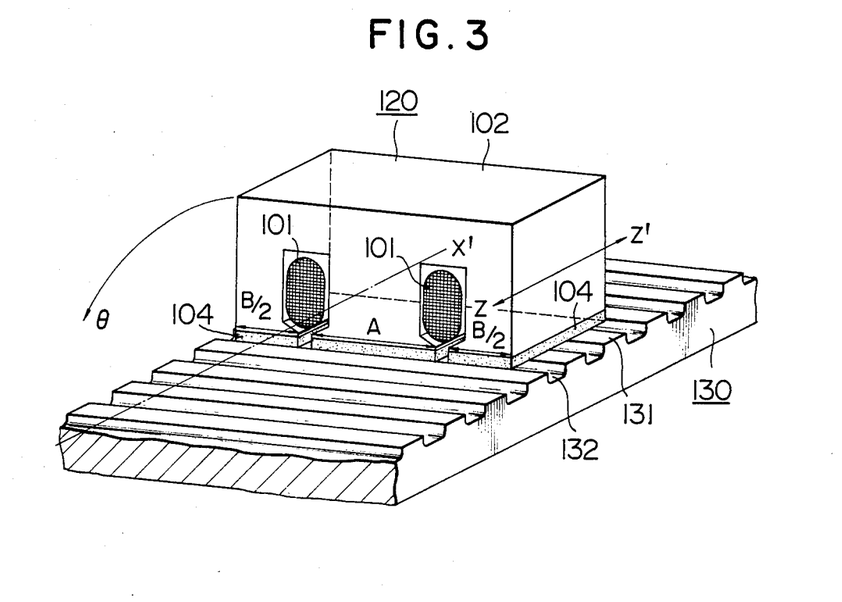
FIG. 3 is a perspective view of a third embodiment according to the present invention.

FIG. 3 is a perspective view of a third embodiment according to the present invention. In the figure, identical reference numbers to those in FIG. 14 represent the same or similar elements to those in FIG. 14.

Although only a single phase mover electromagnetic unit 120 is shown in the figure, in practice the mover is constructed of plural phase units disposed and coupled serial or parallel to each other along the direction of movement Z-Z′. Further, although the mover electromagnetic unit corresponding to a single phase is depicted as having a shorter length along the direction of movement Z-Z′ and a longer length along the direction perpendicular to that of movement Z-Z′, in practice the straight line portion of the armature winding 1 is formed longer. Thus, the side along the direction Z-Z′ is longer than that along the direction perpendicular to the Z-Z′ direction.

The stator rail 130 is constructed of a laminated iron core which is provided with teeth 131 (and grooves 132) at an equal pitch along the direction perpendicular to the movement direction Z-Z′. Solid type iron core may be used if the device is used in a low speed condition.

The yoke 2 of the mover is provided with permanent magnets 104 facing the air gap and the stator rail 130. The permanent magents 4 are polarized as shown in FIG. 4 parallel to the inductor teeth 131 of the stator rail 130.

Figure 4:
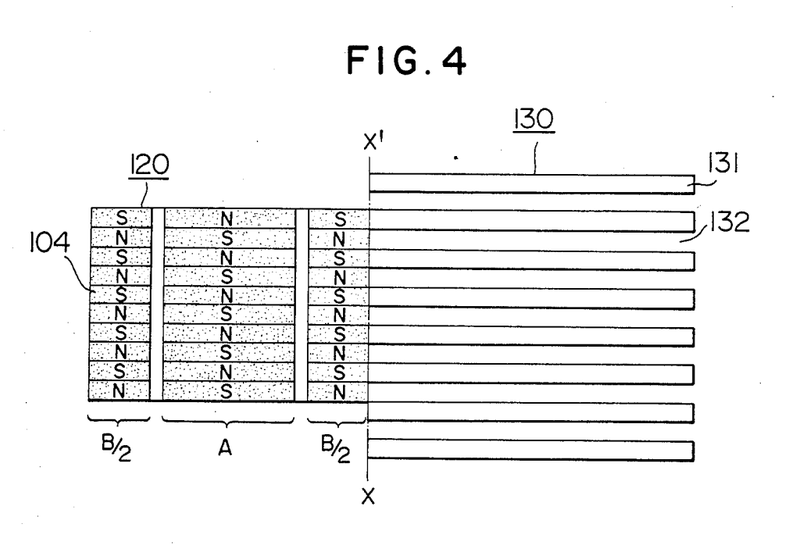
FIG. 4 shows a relation between the polarized pattern of permanent magnets and the inductor teeth, viewed by turning a movable member electromagnetic unit by 180 degrees in the direction about the axis X-X' of FIG. 3.

FIG. 4 shows a relation between the polarized pattern of permanent magnets and the inductor teeth, viewed by turning a mover electromagnetic unit 120 by 180 degrees in the $\theta$ direction about the axis X-X′ of FIG. 3. The polarities of the pole pieces in the A portion surrounded by the armature winding 101 and those of the corresponding pole pieces of the B portion are so set to have opposite polarities to each other.

The operation of the device thus constructed is as follows.

At the position where the N pole piece of the A portion of the mover 120 coincides with the inductor tooth 131 of the stator rail 130, magnetic flux is linked with the armature winding 1 along the path of A(N)→air gap→tooth 31″air gap″B(S)→yoke 102→A(N). If the mover 20 moves by a half tooth pitch, since the S pole pieces of the A portion coincide with the inductor teeth 131, the linked magnetic flux is reversed to form magnetic flux $-\phi$.

Following the similar processes as above, if the mover 120 moves by a single tooth pitch, then one cycle variation of the linked magnetic flux is obtained. As the mover 120 continues to move at a constant speed, a single phase AC voltage of $\sqrt{2}\pi\cdot N\cdot\phi\cdot V/\tau_t$ is generated in the armature winding 1, wherein N represents the number of turns, v represents the speed, $\tau_t$ represents the pitch of teeth, and $\phi$ represents magnetic flux. The magnetic flux $\phi$ is here assumed to change in a sinusoidal way.

In order to operate the device as a motor, a current is passed through the armature winding 101. The magnetomotive force produced by the winding 101 is set to have a smaller value which might not reduce the magnetomotive force of the permanent magnets 104 irreversibly.

If the polarity of the magnetomotive force of the winding is of the nature making the A portion into N pole piece, then the N pole piece of the permanent magnet of the A portion is strengthened, while the S pole piece is weakened. And the S pole piece of the permanent magnet of the B portion is strengthened, while the N pole piece is weakened.

Therefore, the mover 120 is attracted to move in the direction that the N pole piece of the permanent magnet 104 and the S pole piece of the B portion come into coincidence with the inductor tooth 131. If the magnetomotive force of the winding is reversed, then the mover 120 is attracted to move in the direction that the S pole piece of the A portion and the N pole piece of the B portion come into coincidence with the inductor tooth 131. Thus, the device operates as a single phase synchronous machine.

If a plurality of mover electromagnet units 120 are provided and disposed along the movement direction Z-Z′ serial or parallel to each other such that the positions of the permanent magnets 104 relative to the inductor teeth 131 are set to have an equal displacement from the inductor teeth 131, then a multi-phase synchronous machine is realized.

The above structure and operation principle of the device have been described using a so-called right-angled type motor in which the straight line portion of the armature winding 101 and the toothed direction of the inductor teeth 131 are in right angle relation to each other.

Figure 5:
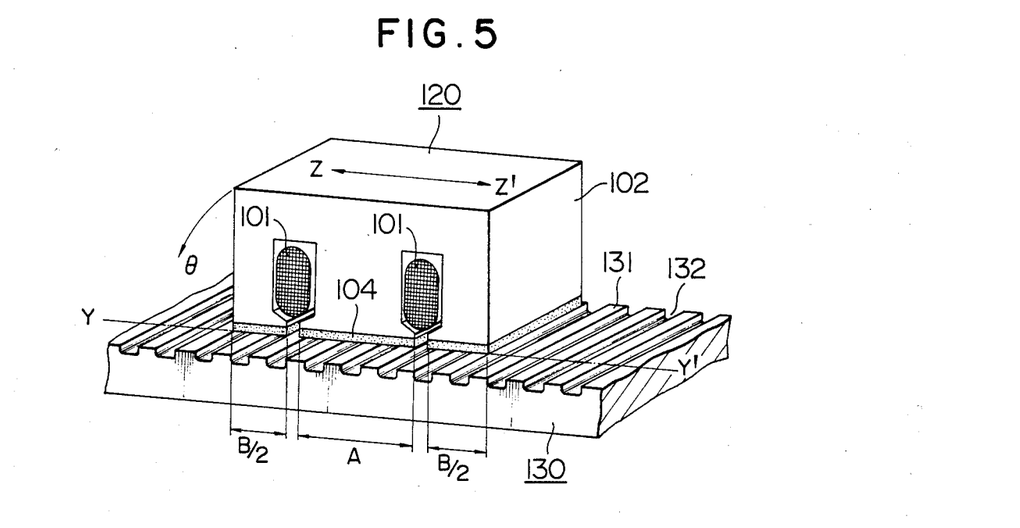
FIG. 5 is a perspective view of another embodiment according to the present invention.
Figure 6:
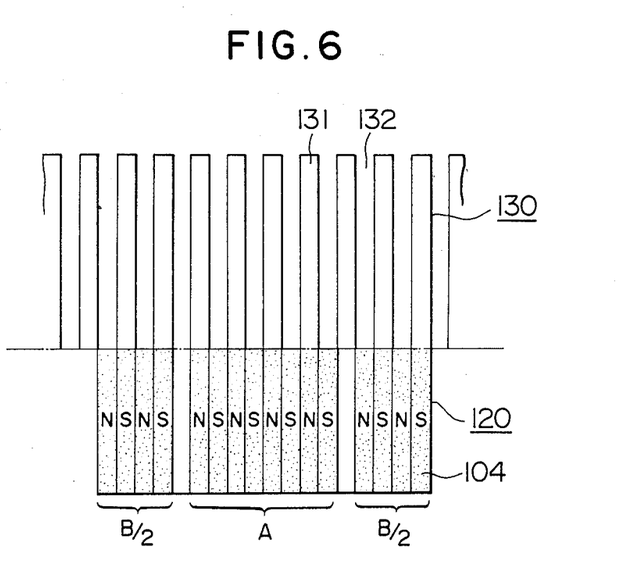
FIG. 6 shows a relation between the polarized pattern of permanent magnets and the inductor teeth, viewed by turning a movable member electromagnetic unit by 180 degrees in the direction about the axis Y-Y' of FIG. 5.

FIG. 5 is a perspective view of a fourth embodiment according to the present invention, and FIG. 6 shows a relation between the polarized pattern of permanent magnets and the inductor teeth, viewed by turning a mover electromagnetic unit by 180 degrees in the direction $\theta$ about the axis Y-Y′ of FIG. 5.

The fourth embodiment applies the structure of the present invention to a parallel type inductor in which the straight line portion of the armature winding 101 and the toothed direction of the inductor teeth 131 are parallel to each other. Although the straight line portion of the armature winding 101 in FIG. 5 is depicted as having a shorter length along the direction perpendicular to that of the movement direction Z-Z', in practice the straight line portion is formed to have a longer length in order to make the efficiency better.

Figure 7:
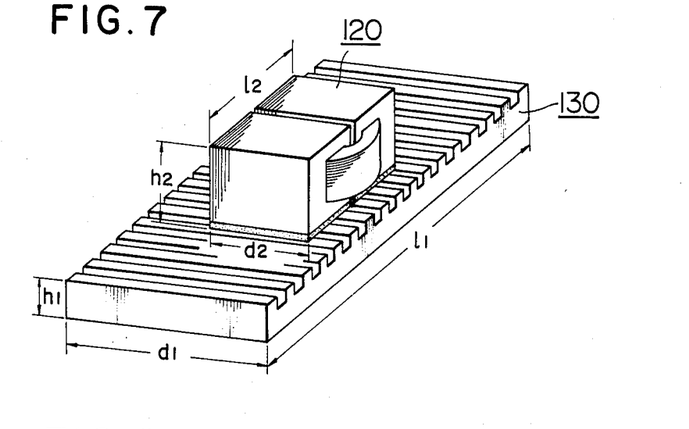
FIGS. 7 and 8 show a perspective view and its partial side elevational view of a prototype stepping motor used for obtaining experimental data.
Figure 8:
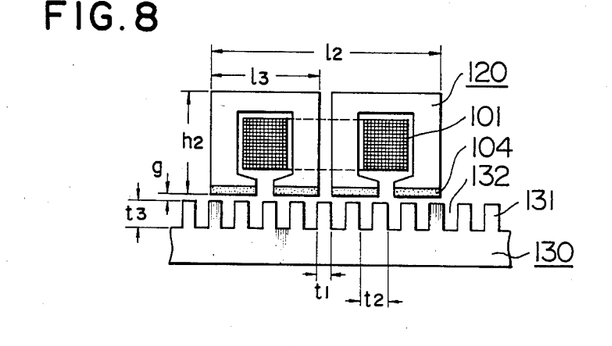

FIGS. 7 and 8 show a perspective view and its partial side elevational view of a prototype stepping motor used for obtaining experimental data.

The main dimensions and electromagnetic properties with respect to the electromagnetic parts of the motor are as follows:

The dimensions of stator 130 are:
$l_1$ ... 500 mm
$d_1$ ... 40 mm
$h_1$ ... 20 mm
and the dimensions of each of the teeth are:
width $t_1$ ... 2 mm
pitch $t_2$ ... 5 mm
height $t_3$ ... 8 mm
therefore, a core thickness is $$h_1 - t_3 = 20 \text{ mm} - 8 \text{ mm} = 12 \text{ mm}.$$

The dimensions of mover 120 (for one phase) are
$l_2$ ... 50 mm
$d_2$ ... 30 mm
$h_2$ ... 30 mm
and the permanent magnet has the dimensions of width (=$d_2$) 300 mm × thickness 0.7 mm × length 10 mm × 4 sheets, is made of $CoSm_5$ cobalt samarium magnet material and has the characteristics of B = 8500 G (gauss) and H = 8000 Oe (oersted).

The electromagnet is made of yoke (core) 102 [C type] and coil 101, the former has the dimensions of width (=$d_2$) 30 mm × height 30 mm × length 22.5 mm × 2 pieces and the latter has the dimensions of diameter 0.5 mm and has 486 turns.

The air gap length (between stator 130 and mover 12) is 0.11 mm.

Figure 9:
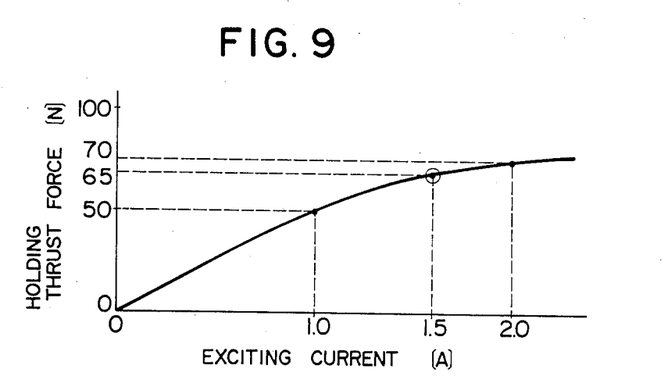
FIG. 9 is a graph showing a relation obtained in the experiment between a holding thrust force and an exciting current of the stepping motor shown in FIGS. 7 and 8.

The characteristics of the motor as above are shown in FIG. 9 which shows the holding thrust force-exciting current characteristics under the conditions that the coil 101 of the motor has recistance of 5.2 Ω, inductance of 125 mH and an electromotive force per speed of 50 V/(m/s). A holding thrust force of 65N was obtained at a current of 1.6 A. At this current, a tangential force per a unit cross sectional area was calculated to obtain:

$$65 N/3 \times 1 \times 4 \text{ cm}^2 = 5.4 N/\text{cm}^2.$$

As appreciated in the above description of the above embodiments, the following effects can be enjoyed.

(a) The mover electromagnet units 120 using an inductor with a concentrated winding has a shorter coil end and magnetic path so that the utility of electromagnetic material is high and the repulsion/weight ratio can be made larger.

(b) Since the freedom of degree of the structure is large such as disposing the mover electromagnet unit 120 serial or parallel to each other along the direction of movement Z-Z', any mounting meeting the requirements of a particular structure can be attained.

(c) Since the device can have a larger power factor and peak torque when compared with those of hybrid or variable reactance type devices, a small capacity of power source may be used, and the control is easy to be carried out.

(d) The amount of magnets to be used is small and the cost is low when compared with conventional permanent magnet type device using permanent magnets on the stator rail. In addition, there is no possibility that the stator rail 130 attracts iron particles.

(e) All of the characteristic features of the right angled type inductor and parallel type inductor as shown in FIGS. 3 and 5 can be enjoyed.

According to still another aspect of the present invention, the three phase linear inductor type motor has a stator and a mover. The stator is made by disposing a plurality of independent inductor teeth made of magnetic material. The mover includes an E shape core and three phase windings wound about the respective three legs of the core, and is guided to move in the longitudinal direction perpendicular to the stator tooth. A plurality of multi-polarized plane permanent magnets are attached and held on the surface of the mover facing the stator and having a constant air gap, the permanent magnets being disposed parallel to the toothed direction and having the same pole pair pitch as that of the inductor teeth. The magnetic pole pitch of the permanent magnets between respective three phase legs has a phase difference of one third of the pole pair pitch.

Figure 10:
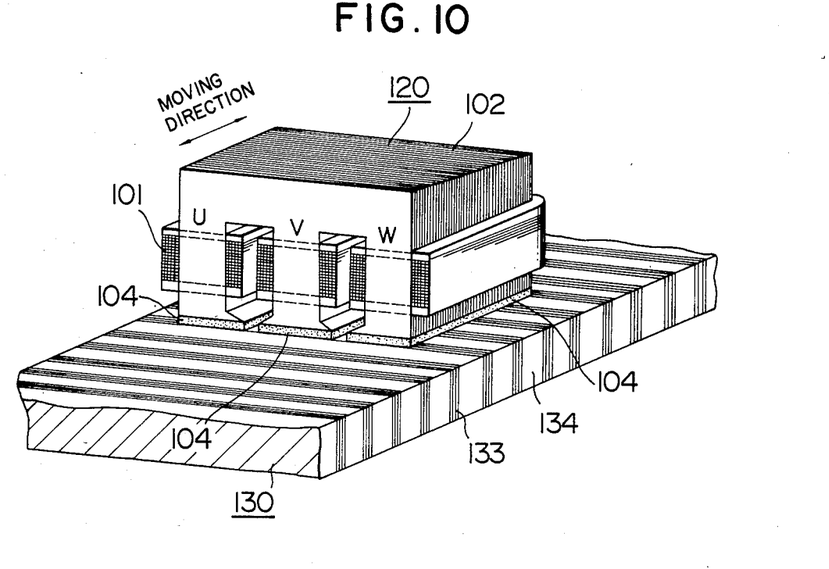
FIG. 10 is a perspective view showing the structure of another embodiment according to the present invention.
Figures 11A, 11B:
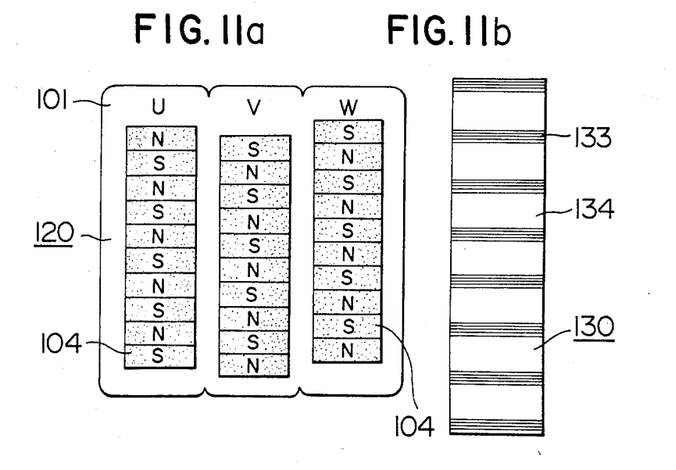

A perspective view of the structure of a fifth embodiment of the present invention is shown in FIG. 10. FIG. 11(a) is a view showing a polarized pattern of each phase and FIG. 11(b) is a plan view of the stator teeth facing those magnets shown in FIG. 11(a).

The stator 130 serving as an inductor is constructed by disposing to sandwich among non-magnetic materials a plurality of magnetic material 133 perpendicular to the longitudinal direction of the stator. The magnetic material 133 is of an elongated shape and has a cross section defined by a constant width (tooth width) and height (yoke thickness).

The mover 120 includes an E type core 2 (e.g., laminated electric steel sheets) commonly used with a three phase transformer and three phase (U, V, W) windings 1 wound about the three legs of the core. The mover is provided with thin plane permanent magnets 4 attached as shown FIG. 11(a) on the end face of the core, that is, on the surfaces facing the stator 130.

The three phase (U, V, W) windings are wound in the mover 120 parallel to each other along the longitudinal direction relative to the stator 130. The mover 120 is supported so as to have a constant air gap between the surface of the stator 130 and the plane magnets 104, and is guided to move along the longitudinal direction.

The mover permanent magnets 104 are multi-polarized parallel to the toothed direction at the same pole pair pitch as that of the teeth of the stator 130 (space between the magnetic materials 133). The magnetic pole pitch of the magnets among the respective three phase legs has a phase difference of one third of the pole pair pitch from each other.

With the structure constructed as above, through the inductor teeth 133 of the stator 130, magnetic flux of the permanent magnets 104 of U, V, and W pole pieces is supplied with its path.

Since the phase difference between each phase pole piece has 120 degrees (electrical angle), as the mover 120 moves, each phase winding is linked with magnetic flux different in phase by 120 degrees to thereby generate a three phase induced voltage. Contrary to the above, if a three phase current is passed through each phase winding, the device operates as a three phase synchronous motor.

Other variations of the embodiment are as follows.

(f) It can readily be thought of that the linear motor can be modified into a rotary motor with an air gap along the shaft direction by using a disk type inductor.

(g) The thrust force can be doubled by providing integrally coupled movers mounted on both sides of the stator. In this case, if the polarities of facing magnets are made opposite to each other, the height of the teeth can be set lower (magnetic flux penetrating type magnetic path).

(h) A Polynoid type (tubular type) linear motor with a tubular inductor may also be attained.

(i) A rotary motor with a cup shape inductor may also be attained.

(j) Although the mover core has been made of an integral three phase core, an independent core for each phase may be used having the corresponding phase winding (single phase type) in which after permanent magnets are attached on the surface facing the stator, the three cores are fixedly attached to obtain a three phase arrangement.

As appreciated from the above embodiment, the following remarkable effects can be enjoyed which are beneficial to the field of the art.

(k) In the case that the magnetic path of the electromagnets is long, and particularly in the case that the mover having a larger length along the direction of movement is used, the utility of windings is good.

(l) Since the groove depth of the inductor teeth can be considered as infinite, the permeance modulation factor becomes large and a large thrust force may be generated.

(m) Since the lamination of the inductor teeth of the stator is readily carried out, the iron loss under a high speed operation does not increase, which leads to a high efficiency.

(n) The manufacture of the stator is easy and can attain a good accuracy. This is the same with the mover.

What is claimed is:

1. A permanent magnet type stepping motor comprising a rotor and a stator:

said rotor being made of a cylindrical laminated iron core whose outer periphery is toothed at an equal pitch and the number of teeth of which is Nr; and said stator being made of a laminated iron core whose inner periphery is formed so as to face said rotor at an air gap between said rotor and said stator, wherein thin plate permanent magnets are attached on the surface of the stator teeth facing said air gap, said permanent magnets are disposed at an equal pitch and polarized such that the polarities of adjacent pole pieces differ from each other, the number of pole pieces is Ns, and has a relation Ns=2(Nr±Np), where Np is an integer, and the stator grooves are half opened or closed and have multi-phase 2 Np pole distributed windings.

2. A permanent magnet type stepping motor according to claim 1, in which said stator is cut away along a line parallel to the rotary axis of said rotor to extend and form said stator plane and said rotor is also cut away along said rotary axis to extend and form said rotor plane, and whereby a linear motor is formed using said stator as a mover and using said rotor as a rail.

3. In a permanent magnet type linear stepping motor of the type that the armature is used as an inductor and the field is produced by multi-polarized permanent magnets, a permanent magnet type linear stepping motor having a mover and a stator:

said mover being constructed of a plural number of units coupled side by side along the direction of movement and the number corresponding to that of phases, said units being respectively provided with a single phase armature winding and yoke and with multi-polarized permanent magnets for producing a field along the direction of movement facing the air gap, said permanent magnets being alternatively magnetized to have N and S pole pieces at an equal pitch along the direction of movement such that the polarities are arranged to have opposite polarities for the pole pieces surrounded by said armature winding and for the pole pieces outside of said armature winding; and said stator being constructed of a laminated iron core of a rail type on the surface of which facing the air gap the inductor teeth are formed at the pole pair pitch of the permanent magnets, and each phase unit being disposed such that the field pole piece has a constant angular displacement relative to said inductor teeth.

4. A three phase linear inductor type motor comprising a stator and a mover:

said stator serving as an inductor and being constructed by disposing at a constant pitch a plurality of magnetic materials perpendicular to the longitudinal direction of said stator, said stator being of an elongated shape and having a cross section defined by a constant width and height; and said mover including an E type core and three phase windings wound about the three legs of said core, said mover being provided with thin plane permanent magnets attached on the end face of said core facing said stator, and said three phase windings being wound in said mover parallel to each other along the longitudinal direction relative to said stator; and wherein said mover is supported so as to have a constant air gap between the surface of said stator and said plane permanent magnets, and is guide to move along the longitudinal direction, said mover permanent magnets are multi-polarized parallel to the direction of movement at the same pole pair pitch as that of teeth of said stator, and the magnetic pole pitch of said magnets among the respective three phase legs has a phase difference of one third of the pole pair pitch from each other.

* * * * *